(12) United States Patent
Ward, Jr. et al.

(10) Patent No.: US 9,747,635 B1
(45) Date of Patent: Aug. 29, 2017

(54) RESERVED INSTANCE MARKETPLACE

(75) Inventors: David John Ward, Jr., Seattle, WA (US); Kiran K. Meduri, Bellevue, WA (US); Peng Zhai, Bellevue, WA (US); Geoffrey S. Pare, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 633 days.

(21) Appl. No.: 13/331,750

(22) Filed: Dec. 20, 2011

(51) Int. Cl.
*G06Q 30/00* (2012.01)
*G06Q 30/08* (2012.01)
*G06Q 30/06* (2012.01)

(52) U.S. Cl.
CPC ......... *G06Q 30/08* (2013.01); *G06Q 30/0645* (2013.01)

(58) Field of Classification Search
CPC .......................................... G06Q 30/00–30/08
USPC ............................................... 705/26.1–27.2
See application file for complete search history.

(56) References Cited

U.S. PATENT DOCUMENTS

| | | | | |
|---|---|---|---|---|
| 2002/0013750 | A1* | 1/2002 | Roberts | G06Q 30/04 705/35 |
| 2005/0222936 | A1* | 10/2005 | Panariti et al. | 705/37 |
| 2008/0262941 | A1* | 10/2008 | Feiner et al. | 705/26 |
| 2010/0198714 | A1* | 8/2010 | Orfano | G06Q 20/10 705/35 |

OTHER PUBLICATIONS

"Xedia joins bandwidth mgmt. fracas." Pappalardo, Denise. Network World, Nov. 17, 1997; 14, 46; Retrieved via ProQuest on Apr. 17, 2017.*

* cited by examiner

*Primary Examiner* — Michael Misiaszek
(74) *Attorney, Agent, or Firm* — Lee & Hayes, PLLC

(57) ABSTRACT

Technologies are described herein for providing a marketplace for the remaining term of reserved instances. A selling customer identifies a reserved instance of a computing resource for which the customer wishes to sell a remainder of their term and specifies an asking price. A reserved instance listing associated with the identified reserved instance and asking price is created. A buying customer provides a specification of reserved instances that they wish to purchase, including a term. The specification may also include size, platform, tenancy, availability zone, and other parameters of the reserved instances. The reserved instance listings are searched to find associated reserved instances matching the specification and having a remaining term equal to or greater than the term in the specification. The reserved instances associated with the reserved instance listings having the lowest asking price may then be transferred from the selling customer to the buying customer.

22 Claims, 13 Drawing Sheets

RESERVED INSTANCE MARKETPLACE

BACKGROUND

Distributed software applications, referred to herein as "cloud applications," are commonly utilized to provide content and functionality to end-users over the Internet or other network infrastructure. For instance, a cloud application might be configured and utilized to provide an e-commerce website. The e-commerce website might provide functionality to the end-users for searching and browsing available products, adding desired products to a virtual shopping cart, and placing an order for the desired products. The underlying cloud application may further include back-end processing functionality for processing payments and fulfilling the order, tracking inventory of products, maintaining the online catalog, and the like. The cloud application for the e-commerce website may include multiple Web servers, database servers, application servers, and other computing resources interconnected and made accessible to the end-users over the Internet.

A cloud computing resource provider may make scalable computing resources available to customers over the Internet or other network infrastructure for the implementation of cloud applications, such as that described above. The cloud computing resource provider may provide facilities for customers to select and launch the desired computing resources, deploy the cloud application components to the computing resources, and maintain the application executing in the environment. In addition, the cloud computing resource provider may provide further facilities for the customer to quickly and easily scale up or scale down the numbers and types of resources allocated to the cloud application, either manually or through automatic scaling, as demand for or capacity requirements of the application change.

The computing resources provided by the cloud computing resource provider may be made available in discrete units, referred to herein as "instances." An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific "availability zones," representing a datacenter or other geographic location of the underlying computing hardware, for example, The cloud computing resource provider may make instances available "on-demand," allowing a customer to select a number of instances of a specific type and configuration (e.g. size, platform, tenancy, availability zone, and the like) and quickly launch the instances for deployment of the cloud application. On-demand instances may further be added or removed as needed, either manually or automatically through "auto-scaling," as demand for or capacity requirements of the cloud application changes over time. The customer may incur ongoing usage costs related to their on-demand instances, based on the number of hours of operation and/or the actual resources utilized, for example.

The cloud computing resource provider may also make "reserved instances" available to the customer. Reserved instances may provide the customer with the ability to reserve a number of a specific type and configuration of instances for a fixed term, such as one year or three years, for a low, upfront cost, in exchange for reduced hourly or other usage costs, for example, if and when the instances are launched. This may allow the customer to defer costs related to scaling up the deployed cloud application in response to increase in demand, while ensuring that the right resources will be available when needed. While reserved instances provide customers with reliable, stand-by capacity for scaling of their cloud application, purchasing reserved instances may also lock the customer into a specific number, type, and/or configuration of computing resource in a specific availability zone for a longer period than desired. If the technical architecture or needs of the cloud application change, the customer may not be able to realize a return on their investment in the reserved instances.

It is with respect to these and other considerations that the disclosure made herein is presented.

DETAILED DESCRIPTION

Figure 1:
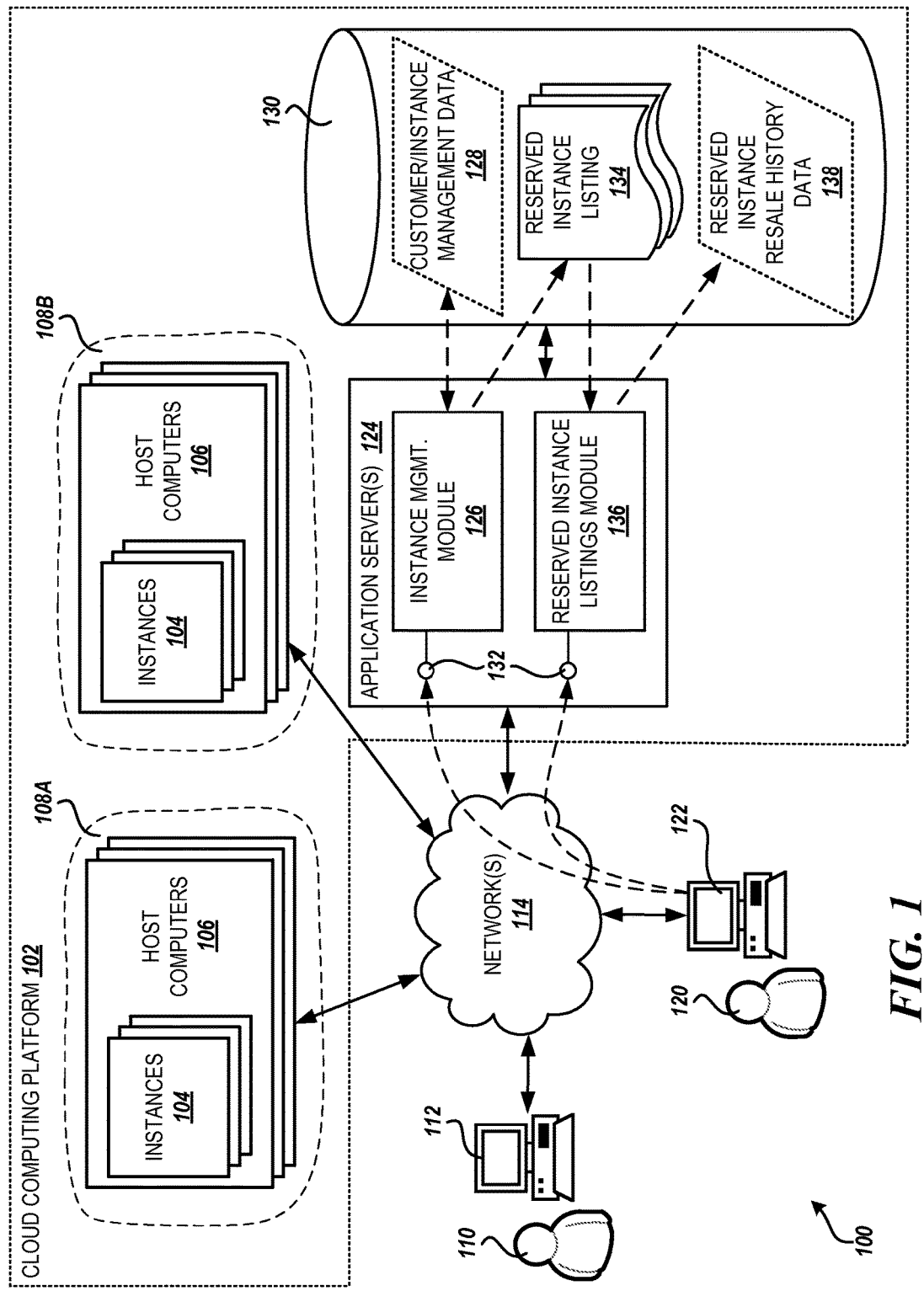
FIG. 1 is a system diagram showing aspects of an illustrative operating environment for providing a marketplace for the remaining term of reserved instances, including several software and hardware components provided by embodiments presented herein.

The following detailed description is directed to technologies for providing a marketplace for the remaining term of reserved instances. Utilizing the technologies described herein, a cloud computing resource provider may implement a reserved instance marketplace that provides a mechanism for customers who no longer want or need their reserved instances to connect with other customers who want to buy shorter-term reserved instances than those generally provided by the cloud computing resource provider. A customer may list the remainder of the term of their reserved instances, or a portion thereof, for a purchase amount that they choose in the reserved instance marketplace, allowing them to be matched with one or more buyers who wish to purchase the reserved instances. Selling customers may be provided with a method of mitigating the risk of being locked into long-term reserved instances that the customer no longer needs or wants, while buying customers may be provided a broader selection of reserved instances with shorter term lengths that more closely fit their needs.

While the disclosure herein describes the implementation of a marketplace for buying and selling the remaining term in reserved instances of data processing resources, it will be appreciated that this implementation is for illustrative purposes only, and that the technologies described herein may be utilized to create a marketplace allowing customers to buy and sell the remaining term in any other term-based resource having specific parameters or attributes. It will be further appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, hand-held computers, personal digital assistants, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system diagram that shows an illustrative operating environment 100 including several software components for implementing a marketplace for the remaining term of reserved instances, according to embodiments provided herein. The environment 100 includes a cloud computing platform 102. The cloud computing platform 102 may be implemented by a cloud computing resource provider to make computing resources available to customers 120 for the deployment and execution of distributed cloud applications.

The computing resources provided by the cloud computing platform 102 may include various classes of resources, such as data processing resources, data storage resources, data communication resources, and the like. Each class of computing resource may be general-purpose or may be available in a number of specific configurations. For example, data processing resources provided by the cloud computing resource provider may be made available in discrete units, or "instances" 104. Each instance 104 may represent the data processing resources of a dedicated host computer 106, referred to herein as a "dedicated tenancy" instance, or each instance 104 may represent a virtual machine instance executing on a host computer 106, referred to herein as a "shared tenancy" instance.

The host computers 106 may represent generic multi-processor server devices, special-purpose hardware devices, and the like. Various types and configurations of instances 104 may be made available. For example, each available instance 104 of data processing resources may be of a particular size, such as small, medium, and large, representing different combinations of physical and/or virtual resources comprising or allocated to the instance, such as number and types of processors, amounts of memory, size and speed of local storage, number of networking addresses or communication channels, and/or the like. An instance 104 may further be configured with a particular platform, such as a specific operating system ("OS") and/or hypervisor installed on the instance. Instances 104 may also be made available with specific application software components installed, such as Web server software, database management software, portal software, a specific runtime environment or platform, and the like.

Instances may further be available in specific "availability zones" 108A-108B (referred to herein as availability zones 108 or availability zone 108). An availability zone 108 may represent a particular physical location, such as a datacenter, or other physical and/or logical grouping of the underlying host computers 106 and computing devices supporting the instances 104 provided by the cloud computing platform 102. Providing instances 104 of different sizes and in different availability zones 108 may allow a deployed cloud application to be geographically dispersed, improving end-user performance and insulating the overall application from failures in one particular location or zone. For example, a customer 120 may choose to deploy a number of small instances 104 across multiple availability zones 108 for some functions of the cloud application, such as Web servers, while deploying a single large instance 104 for other functions, such as a database server, for example. The customer 120 may also require that instances 104 be hosted by host computers 106 in particular geographical locations for geopolitical reasons, as well.

End-users 110 may utilize end-user computer systems 112 to access the functionality of the cloud application executing on the allocated instances 104 through one or more networks 114. The network(s) 114 may represent a combination of local-area networks ("LANs"), wide-area networks ("WANs"), the Internet, and/or any other networking infrastructure known in the art that connects the host computers 106 in the cloud computing platform 102 to the end-user computer systems 112, to each other, and to other computing resources. The end-user computer systems 112 may represent personal computers ("PCs"), desktop workstations, laptops, notebooks, personal digital assistants ("PDAs"), electronic-book readers, game consoles, set-top boxes, consumer electronics devices, server computers, or any other computing device capable of connecting to the network(s) 114 and communicating with the host computers 106 in the cloud computing platform 102.

A customer 120 wishing to deploy a cloud application on the cloud computing platform 102 may similarly utilize a customer computer system 122 to connect the cloud computing platform over the network(s) 114 to configure and manage the computing resources provided by the cloud computing platform. In this regard, the cloud computing platform 102 may include a number of application servers 124 that provide various management services to the customer 120 for purchasing and maintaining instances 104 of data processing and/or other computing resources, deploying components of the cloud application across the purchased instances 104, monitoring and administering execution of the cloud application, and the like. As in the case of the end-user computer systems 112, the customer computer systems 122 may represent personal computers ("PCs"), desktop workstations, laptops, notebooks, personal digital assistants ("PDAs"), electronic-book readers, game consoles, set-top boxes, consumer electronics devices, server computers, or any other computing device capable of connecting to the network(s) 114 and communicating with the application servers 124 in the cloud computing platform 102.

The application servers 124 may represent standard server computers, database servers, web servers, network appliances, desktop computers, other computing devices, and any combination thereof. The application servers 124 may execute a number of modules in order to provide the management services. The modules may execute on a single application server 124 or in parallel across multiple application servers in the cloud computing platform 102. In addition, each module may consist of a number of subcomponents executing on different application servers 124 or other computing devices in the cloud computing platform 102. The modules may be implemented as software, hardware, or any combination of the two.

The application servers 124 may execute an instance management module 126. The instance management module 126 may allow customers 120 to purchase and configure instances 104 of data processing or other computing resources, manage and maintain purchased instances 104, and the like. Purchased instances 104 for each customer 120 and corresponding configuration and status information may be stored in customer/instance management data 128. The customer/instance management data 128 may be stored in a database 130 or other data storage system available to the application server(s) 124 in the cloud computing platform 102.

A customer 120 may utilize a Web browser application executing on the customer computer system 122 to access a user interface ("UI") presented by the instance management module 126 through a Web service to perform the configuration and maintenance of their purchased instances 104. Additionally or alternatively, the instance management module 126 may expose an application programming interface ("API") 132 which may be accessed over the network(s) 114 by stand-alone application programs executing on the customer computer system 122. Other mechanisms for accessing the configuration and maintenance services of the instance management module 126 may also be imagined, including remote procedure calls, SOAP-based web services, remote file access, proprietary client-server architectures, and the like.

According to embodiments, the instance management module 126 may allow customers 120 to purchase both "on-demand" instances 104 and "reserved" instances. On-demand instances 104 may be purchased and launched immediately, allowing for quick deployment of the components of the cloud application. On-demand instances 104 may further be added or removed as needed, either manually or automatically through "auto-scaling," as demand for or capacity requirements of the cloud application changes over time. The customer 120 may incur ongoing usage costs related to their on-demand instances, based on the number of hours of operation of the instances 104 and/or the actual resources utilized, for example.

Reserved instances 104 provide the customer with the ability to reserve a number of a specific type and configuration of instances for a term, such as one year or three years. The reserved instances 104 may represent actual instances of data processing resources configured as specified and placed in stand-by for launch and deployment by the customer 120 at a future time, or the reserved instances 104 may represent overall capacity reserved by the cloud computing resource provider for quick configuration and launch when required. When deploying a cloud application, a customer 120 may purchase and launch a number of on-demand instances 104 of a specific type and configuration (e.g. size, platform, tenancy, availability zone, and the like) to support immediate availability of the application, as well as a number of reserved instances of the same or similar type and configuration for scaling up the application in the future in response to increased demand or capacity requirements of the application, for example.

However, over time, a customer 120 may determine that they no longer need the reserved instances 104 purchased at deployment of the cloud application. For example, the technical architecture of the cloud application may change, requiring data processing instances 104 of a different size or platform for future scaling of the application. Similarly, demand for the application may change requiring fewer instances 104 or requiring instances in different availability zones 108 than originally anticipated. The customer 120 may wish to sell the remaining term in their reserved instances 104 to other customers of the cloud computing platform 102 in order to recover some of the original investment in the purchased reserved instances. Or, the customer may wish to get out of a contract for reserved instances that have ongoing periodic fees but which the customer is not currently utilizing. In this regard, the instance management module 126 may further allow the customer 120 to select a number of reserved instances 104 to sell in a reserved instance marketplace, as will be described below in regard to FIG. 2. The instance management module 126 may store information regarding the reserved instance(s) 104 selected for sale through the reserved instance marketplace in reserved instance listings 134 in the database 130 or other data storage system available to the application server(s) 124 in the cloud computing platform 102.

The application servers 124 may further execute a reserved instance listings module 136. The reserved instance listings module 136 may allow customers 120 to browse and purchase the remaining terms in reserved instances 104 previously purchased by other customers, as will be described below in regard to FIG. 7. A customer 120 may utilize a Web browser application executing on the customer computer system 122 to access a user interfaces ("UI") presented by the reserved instance listings module 136 through a Web service to browse and select reserved instances 104 listed in the reserved instance marketplace for purchase. Additionally or alternatively, the reserved instance listings module 136 may expose an API 132 which may be accessed over the network(s) 114 by stand-alone application programs executing on the customer computer system 122.

The reserved instance listings module 136 may access the reserved instance listings 134 in the database 130 to determine availability and pricing for reserved instances 104 meeting specified type and configuration requirements (e.g. size, platform, tenancy, availability zone, and the like) as well as the quantity and term of the reserved instances desired. The reserved instance listings module 136 may also effect purchase and transfer of the desired reserved instances 104 from the selling customer(s) 120 to the buying customer. The reserved instance listings module 136 may further store data regarding each sale of the remaining term in a reserved instance 104 through the reserved instance marketplace in reserved instance resale history data 138 in the database 130 or other data storage system. The reserved instance resale history data 138 may be utilized by other customers 120 or the cloud computing resource provider to analyze pricing and term data regarding the sale of reserved instances 104 through the reserved instance marketplace.

Turning now to FIGS. 2-9, additional details will be provided regarding the embodiments presented herein for providing a marketplace for the remaining term of reserved instances. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

Figure 2:
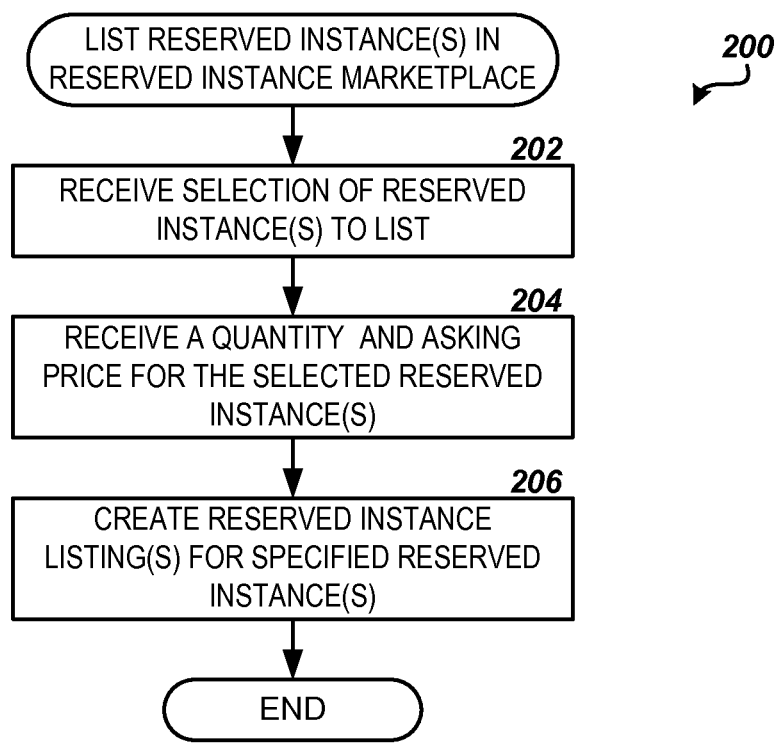
FIG. 2 is a flow diagram showing aspects of one method of listing a reserved instance in the reserved instance marketplace, according to embodiments presented herein.

FIG. 2 illustrates a routine 200 for listing reserved instances in the reserved instance marketplace, according to the embodiments described herein. The routine 200 may be performed by the instance management module 126 and/or other modules or components executing on the application servers 124 in the cloud computing platform 102, or by any other combination of modules and components. The routine 200 begins at operation 202, where the instance management module 126 receives a selection of one or more reserved instances 104 for which a selling customer 120 desires to list the remaining terms for sale in the reserved instance marketplace.

Figure 3:
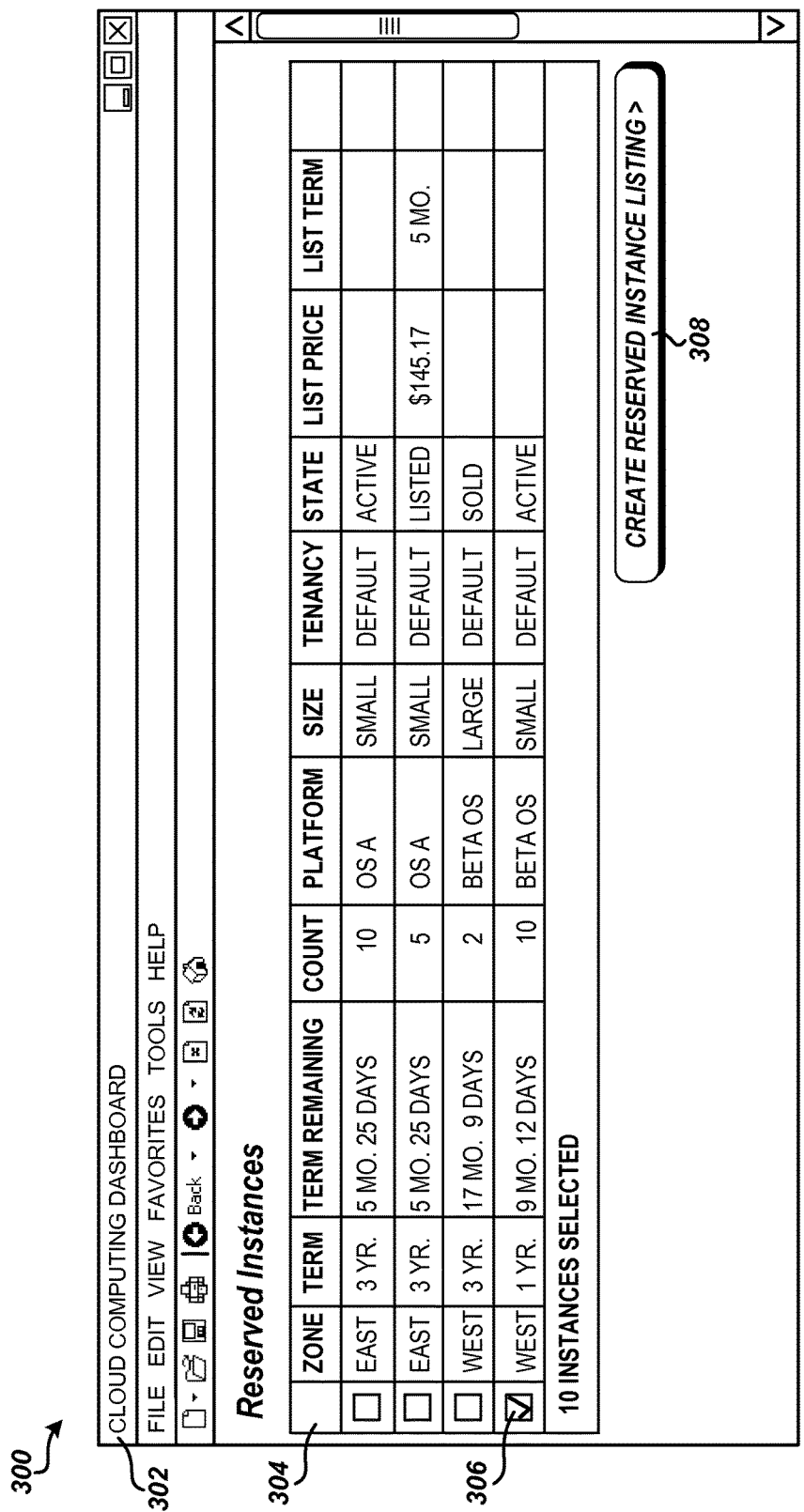
FIGS. 3-5 are screen diagram showing illustrative user interfaces for listing a number of reserved instances for listing in the reserved instance marketplace, according to embodiments presented herein.

In one embodiment, the selling customer 120 may utilize a UI presented by the instance management module 126 to select the reserved instances to be listed. For example, as shown in FIG. 3, the instance management module 126 or another module in the cloud computing platform 102 may present the UI 300 to the customer 120 in a window 302 of a Web browser or other client application executing on the customer computer system 122. The UI 300 may include a reserved instance list 304 listing the reserved instances 104 currently owned by the customer 120, including the type and configuration parameters of each, such as the availability zone, platform, size, tenancy, and the like. The reserved instance list 304 may further include the original term of each reserved instance 104, and the remaining term until the reserved instance expires. The reserved instance list 304 may also include the current state of the reserved instances 104, such as whether the reserved instances are active, have expired, are listed for sale in the reserved instance marketplace, have sold through the reserved instance marketplace, and the like.

The UI 300 may further include a selection UI control, such as the checkbox UI control 306 shown in FIG. 3, that allows the customer 120 to select one or more reserved instances 104 shown in the reserved instance list 304 for listing in the reserved instance marketplace, after which the customer 120 may select a command UI control, such as the create listing UI control 308 shown in FIG. 3. Other methods of selecting reserved instances 104 for listing in the reserved instance marketplace through the UI 300 may also be imagined, including selecting a line in the reserved instance list 304 with a mouse or other input control, and selecting a command UI control from a context menu presented by the instance management module 126 for the selected line, for example.

Figure 4:
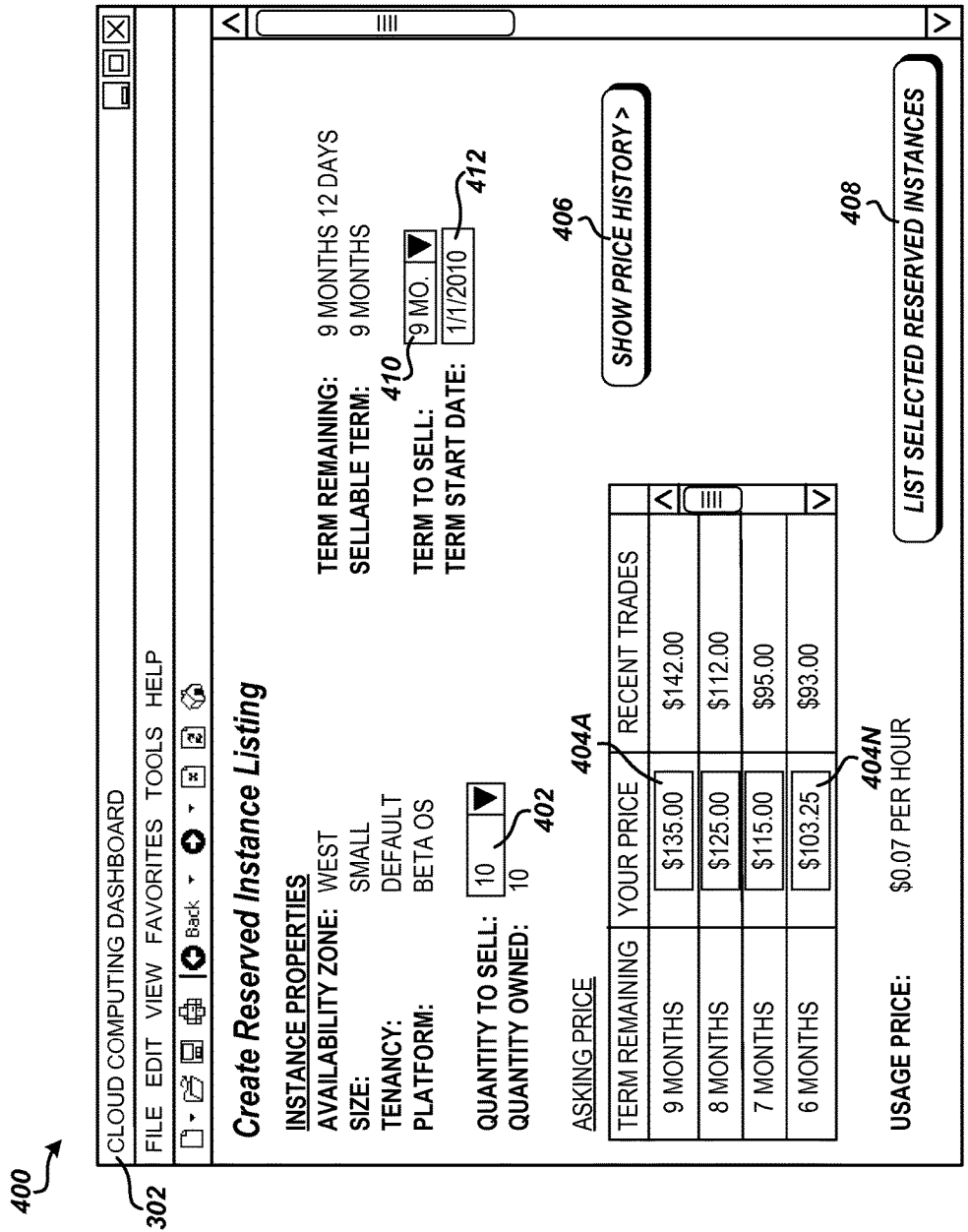

From operation 202, the routine 200 proceeds to operation 204, where the instance management module 126 receives a quantity and asking price for the reserved instance(s) selected in operation 202. For example, upon selecting the create listing UI control 308 in the UI 300 shown in FIG. 3, the instance management module 126 or another module in the cloud computing platform 102 may present the UI 400 to the customer 120, as shown in FIG. 4. The UI 400 may be presented in the window 302 of a Web browser or other client application executing on the customer computer system 122, for example. The UI 400 may include a summary of the selected one or more reserved instances 104 from operation 202, including the type and configuration parameters (e.g. availability zone, platform, size, tenancy, and the like) and the remaining term in the reserved instance(s). The UI 400 may further include a quantity selection UI control 402, allowing the customer 120 to select a quantity of the selected reserved instance(s) 104 to be listed in the reserved instance marketplace, from one up to the quantity owned, for example.

The UI 400 may further include a number of asking price entry UI controls 404A-404N, allowing the customer 120 to specify an asking price for the remaining term of the reserved instance(s). According to one embodiment, the customer 120 may be able to list the selected reserved instance(s) 104 for a term equal to the remaining term rounded down to the nearest minimum sellable period, such as a month, a day, an hour, or the like, so that listed reserved instances may be grouped together in appropriate listing "buckets" by number of periods of term remaining. For example, if a selected reserved instance 104 has 9 months and 12 days remaining, the customer 120 may be able to sell a 9 month remaining term of the reserved instance in the reserved instance marketplace. In one embodiment, the asking price may be defaulted to the last selling price of a reserved instance 104 with similar type and configuration parameters (e.g. availability zone, platform, size, tenancy, and the like) for the selected term, as determined from the reserved instance resale history data 138. Additionally or alternatively, the last selling price may be displayed to the customer 120 in the UI 400, as further shown in FIG. 4. In another embodiment, the default asking price may be determined from straight-line depreciation of the purchased reserved instance 104, if no matching previous sales data are available in the reserved instance resale history data 138.

In another embodiment, the UI 400 may include multiple asking price entry UI controls 404A-404N allowing the customer 120 to specify the asking price for the reserved instance(s) 104 if they were to sell immediately (the current maximum sellable term rounded down from the remaining term), as well as different asking prices for subsequent periods, from the maximum sellable term to a minimal sellable term, such as one month. By setting separate asking prices for different terms, customers 120 may be able to price reserved instances higher on a per remaining period basis for shorter terms and closer to the general list price for longer terms, for example. As described above, reserved instances may have two pricing dimensions: a one-time purchase price and usage fees. According to embodiments, the customer 120 may set the asking price for the remaining term of the selected reserved instances 104, but the usage price to the buying customer of the reserved instance may remain the same as originally set when the reserved instance was purchased by the selling customer.

In another embodiment, the UI 400 may allow the specification of a portion of the remaining term in the reserved instance(s) 104 to be listed for sale in the reserved instance marketplace. For example, a term to sell selection UI control 410 may allow the portion of the remaining term to be selected from the current maximum term to the minimal sellable term. In order to support the listing of a portion of the remaining term, the instance management module 126 may split the term of the reserved instance(s) in the customer/instance management data 128 into three segments, one segment comprising the original purchase date of the reserved instance(s) to the current date, a second segment comprising the current date to the end of the portion of the remaining term selected for listing of the reserved instances, and a third segment comprising the remainder of the term after portion to be listed for sale in the reserved instance marketplace.

Additionally, the UI 400 may allow the customer 120 to specify that the selected portion of the remaining term is to be available at some point in the future. For example, the UI 400 may include a start date entry UI control 412 that allows the specification of a future date for the listing of the selected portion of the remaining term in the reserved instance(s) 104. The instance management module 126 and/or the reserved instance listings module 136 may adjust the term of the reserved instance(s) 104 as listed in the reserved instance marketplace as of the beginning of the specified date range based on the actual term remaining in the reserved instances at that time. Allowing the specification of a start date for listing the reserved instance(s) 104 in the reserved instance marketplace may allow buying customers 120 to search for future availability in reserved instances 104 of a specific term, for example.

Figure 5:
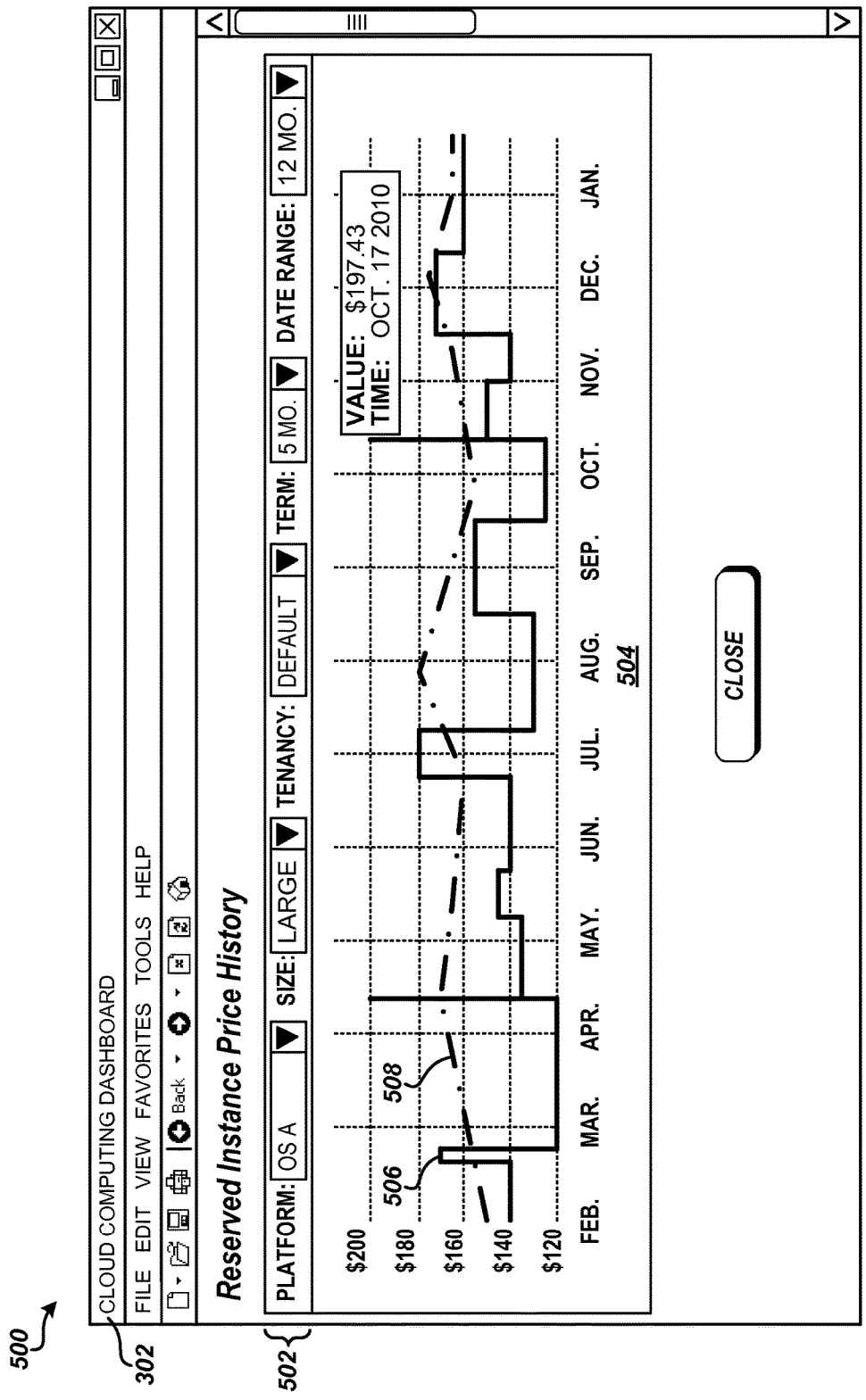

In further embodiments, the instance management module 126 may provide pricing history from the reserved instance resale history data 138 to assist the customer 120 in selecting an asking price for the remaining term of the selected reserved instance(s) 104. For example, the customer 120 may select the show price history UI control 406 from the UI 300 to show a reserved instance price history UI 500, as shown in FIG. 5. The reserved instance price history UI 500 may be shown to the customer 120 in the window 302 of the Web browser or other client application executing on the customer computer system 122, for example. The reserved instance price history UI 500 may include selection UI controls 502 that allow the customer 120 to select values for one or more type and configuration parameters (e.g. platform, size, tenancy, and the like) along with a remaining term and a date range for searching the reserved instance resale history data 138.

The reserved instance price history UI 500 may further include a historical price graph 504 showing the selling price of the remaining term of reserved instances 104 matching the selected configuration parameter values and term within the date range specified. The historical price graph 504 may include a graph of the selling price of the remaining term of reserved instances 104 matching the specified parameters, as shown by line 506, as well as a moving average of the selling price for like reserved instances, as shown by line 508. It will be appreciated that other historical sales and pricing information may be available to the customer 120, beyond the historical price graph 504 shown in FIG. 5, that may include additional or alternative information regarding the historical sales price for reserved instances 104 matching the specified parameter values and term as determined from the reserved instance resale history data 138.

Once a quantity and asking price have been entered for the selected reserved instance(s) 104, the customer 120 may select a command UI control, such as the list reserved instances command UI control 408 shown in FIG. 4, to submit the selected reserved instance(s) for sale in the reserved instance marketplace with the selected asking price and term. In alternative embodiments, the customer computer system 122 may utilize a SubmitReservedInstanceListing API or other API 132 exposed by the instance management module 126 to specify the one or more reserved instances 104, along with a quantity, asking price, and term, for which the customer 120 desires to list the remaining terms for sale in the reserved instance marketplace. Similarly, the customer computer system 122 may upload a flat file or structured storage file to the instance management module 126 or some other module in the cloud computing platform 102 identifying one or more reserved instances 104 with asking price and term for listing in the reserved instance marketplace.

Figure 6:
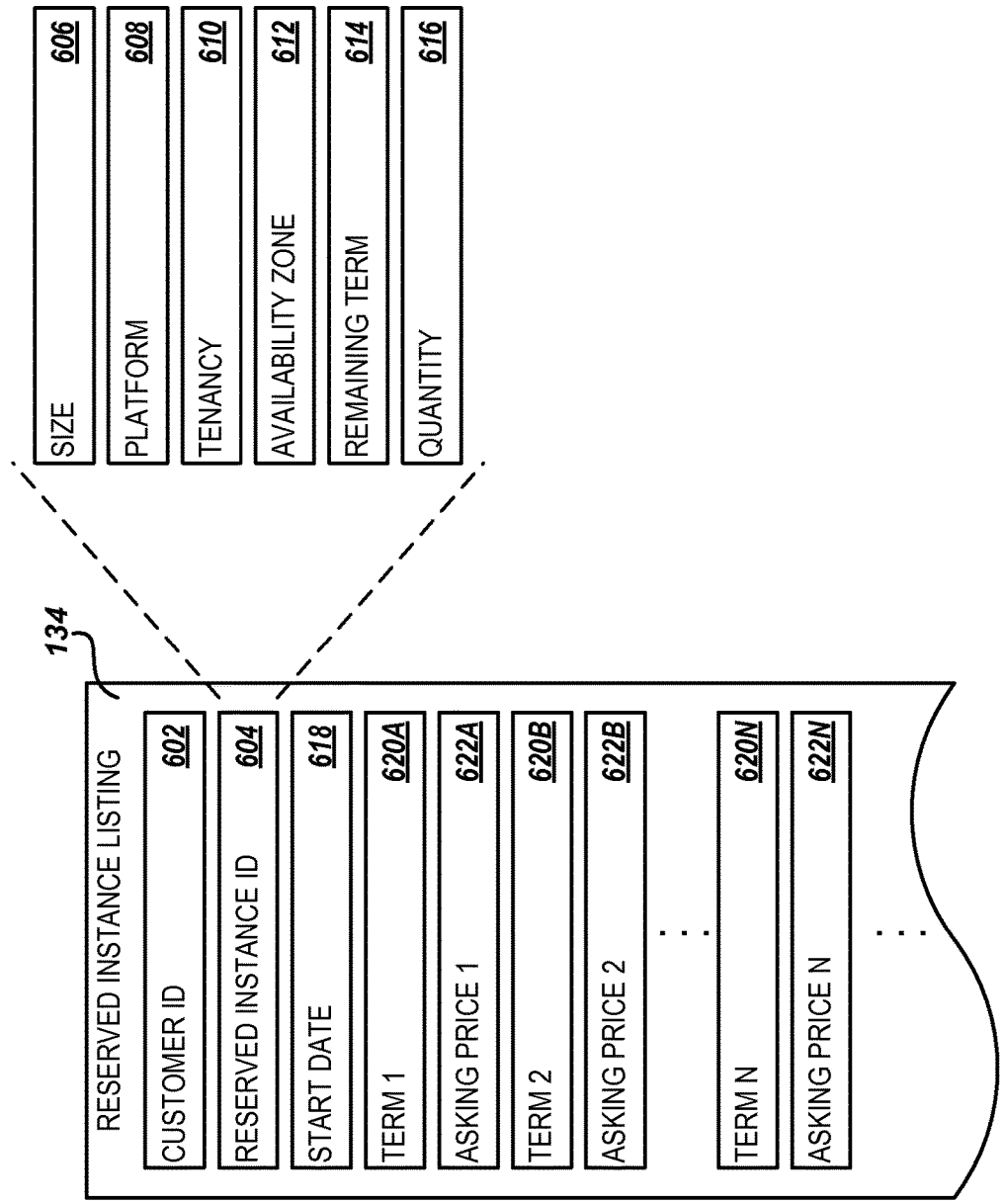
FIG. 6 is a data structure diagram illustrating a number of data elements maintained for a reserved instance listing, according to embodiments presented herein.

The routine 200 proceeds from operation 204 to operation 206, where the instance management module 126 creates one or more reserved instance listings 134 in the database 130 or other storage system representing the reserved instance(s) 104 for which the customer 120 desires to list the remaining terms for sale in the reserved instance marketplace. FIG. 6 is a data structure diagram showing a number of data elements stored in each reserved instance listing 134 regarding the reserved instance(s) 104 to be listed. It will be appreciated by one skilled in the art that the data structure shown in the figure may represent a data file, a database table, an object stored in a computer memory, a programmatic structure, or any other data container commonly known in the art. Each data element included in the data structure may represent one or more fields in a data file, one or more columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

As shown in FIG. 6, each reserved instance listing 134 may contain a customer ID 602 identifying the customer 120 of the cloud computing platform 102 that wishes to sell the remaining term in the associated reserved instance(s) 104. According to one embodiment, each reserved instance listing 134 also contains a reserved instance ID 604 identifying the specific reserved instance 104 for which the remaining term is to be listed. The reserved instance ID 604 may correspond to information regarding the reserved instance 104 stored in the customer/instance management data 128, for example. In this embodiment, each reserved instance 104 for which the remaining term is to be listed may have an associated reserved instance listing 134 in the database 130.

In another embodiment, the reserved instance listing 134 may additionally or alternatively contain the type and configuration parameters describing the associated reserved instance(s) 104, including the size 606, platform 608, tenancy 610, availability zone 612, and the like. In addition, the reserved instance listing 134 may contain an indication of the remaining term 614 in the reserved instance(s) 104, and a quantity 616 of the reserved instances matching the type and configuration parameters to be listed in the reserved instance marketplace. The reserved instance listing 134 may also contain a start date 618 indicating a date at which the indicated term(s) of the associated reserved instance(s) 104 are to be available in the reserved instance marketplace. The start date 618 may be indicated by the selling customer when the customer wishes to sell a portion of the remaining term in the reserved instance(s) 104 at some point in the future, as described above in regard to FIG. 4.

The reserved instance listing 134 further contains one or more terms 620A-620N (also referred to herein generally as term 620) and asking prices 622A-622N (also referred to herein generally as asking price 622). As further discussed above in regard to FIG. 4, the customer 120 may be able to specify multiple asking prices 622A-622N for different terms 620A-602N, from the current maximum sellable term rounded down from the remaining term of the reserved instance(s) 104 to the minimum sellable period. The reserved instance listing 134 may include the multiple asking prices 622A-622N in order to allow the listing to remain active in the reserved instance marketplace as the sellable remaining term of the associated reserved instance(s) 104 decreases from period to period. It will be appreciated that the reserved instance listing 134 may contain additional data elements beyond those shown in FIG. 6 and described above that are utilized by the instance management module 126, the reserved instance listings module 136, and/or other modules of the cloud computing platform 102 implementing the reserved instance marketplace.

In additional embodiments, the instance management module 126 or other modules in the cloud computing platform 102 may provide UIs or APIs 132 to the customer 120 and/or customer computer system 122 that allow the customer to modify their reserved instance listings 134 in the database 130, check the status of any pending sale of the associated reserved instance(s) 104, and/or to delete the reserved instance listings 134 if it is no longer desired to sell the remaining term in the associated reserved instance(s) in the reserved instance marketplace. From operation 208, the routine 200 ends.

Figure 7:
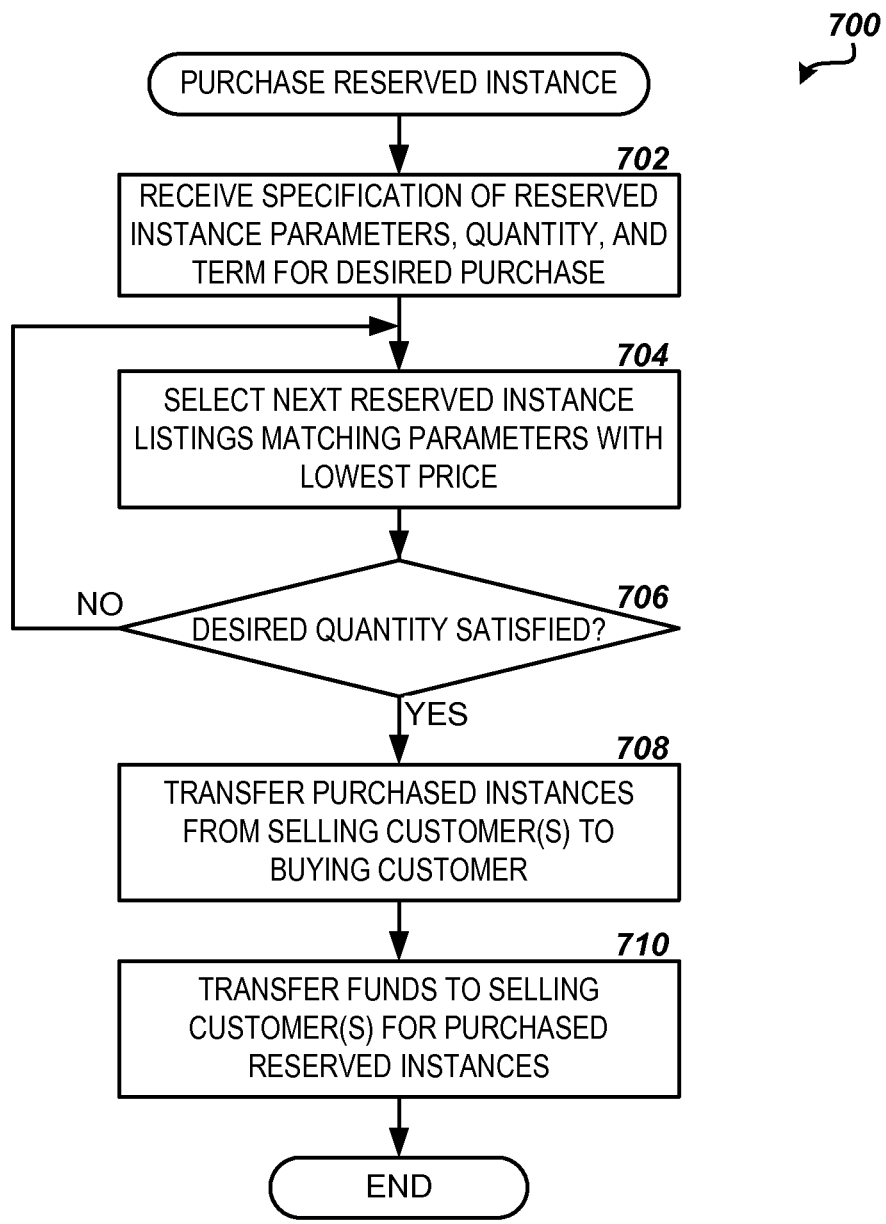
FIG. 7 is a flow diagram for one method of purchasing reserved instances through the reserved instance marketplace, according to embodiments described herein.

FIG. 7 illustrates a routine 700 for purchasing one or more reserved instances 104 through the reserved instance marketplace, according to the embodiments described herein. The routine 700 may be performed by the reserved instance listings module 136 and/or other modules or components executing on the application servers 124 in the cloud computing platform 102, or by any other combination of modules and components. The routine 700 begins at operation 702, where the reserved instance listings module 136 receives type and configuration parameters (e.g. availability zone, platform, size, tenancy, and the like) defining reserved instance(s) 104 that a buying customer 120 desires to purchase through the reserved instance marketplace. The reserved instance listings module 136 may further receive a remaining term for the specified reserved instance(s) 104, as well as the quantity of reserved instances desired to be purchased.

Figure 8:
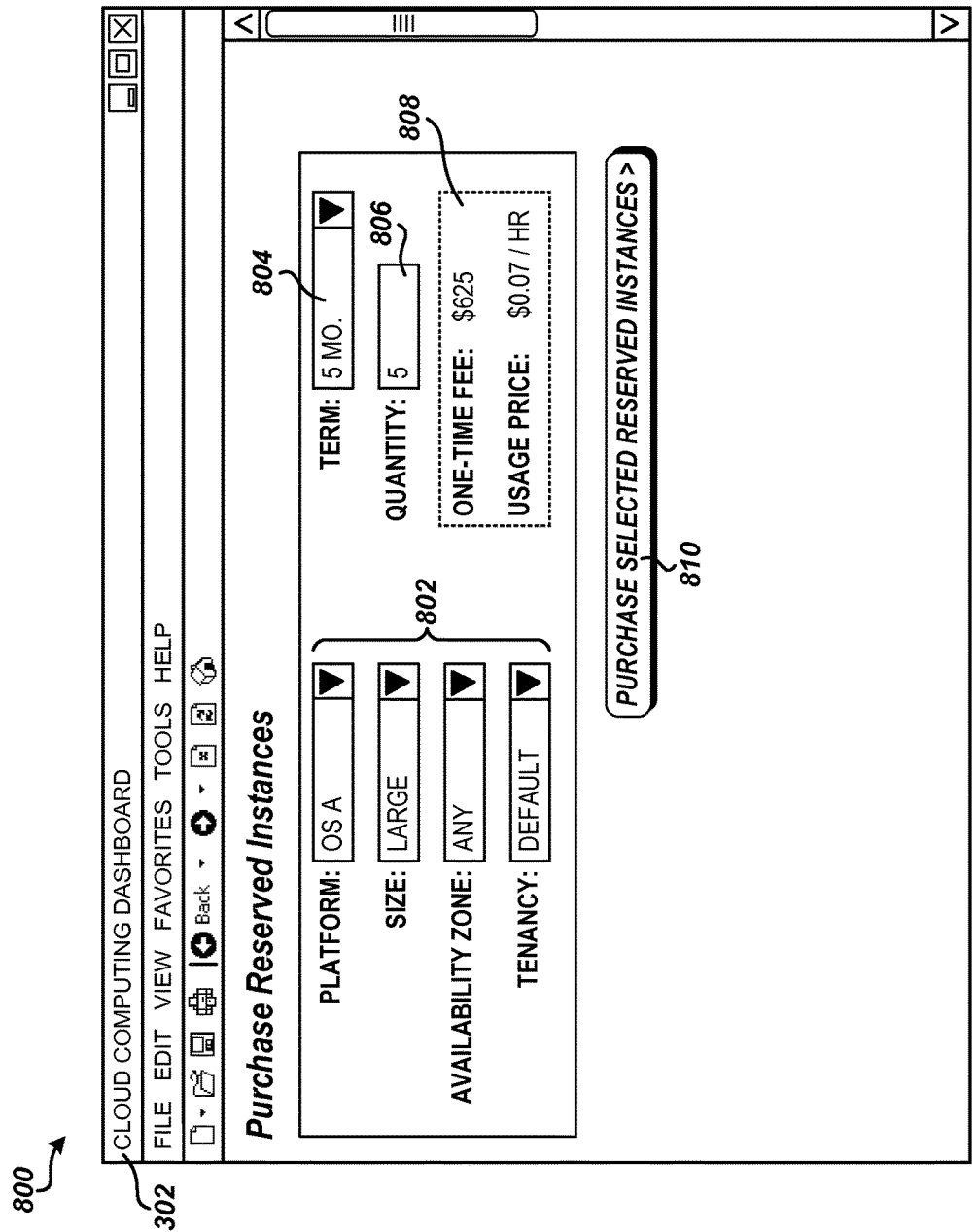
FIGS. 8-10 are screen diagrams showing illustrative user interfaces for purchasing reserved instances through the reserved instance marketplace, according to embodiments presented herein.

In one embodiment, the buying customer 120 may utilize a UI presented by the reserved instance listings module 136 to specify the type and configuration parameters, term, and quantity of the reserved instances to be purchased. For example, as shown in FIG. 8, the reserved instance listings module 136 or another module in the cloud computing platform 102 may present the UI 800 to the customer 120 in the window 302 of the Web browser or other client application executing on the customer computer system 122. The UI 800 may include selection UI controls 802 allowing the customer 120 to specify values for one or more of the type and configuration parameters (e.g. availability zone, platform, size, tenancy, and the like) for the reserved instances being purchased. If a particular parameter value, such as availability zone, is not important to the customer 120, the customer may leave the value for that parameter as "Any," as shown in FIG. 8.

The UI 800 may also include a term selection UI control 804 that allows the customer 120 to specify a term for the reserved instance(s) 104 the customer wishes to purchase through the reserved instance marketplace. As discussed above, the customer 120 may be able to specify a term, such as 6 months or 9 months, that is substantially less than general term normally offered for reserved instances through the cloud computing platform 102, which may be on the order of one to three years. Additionally, the UI may include a desired quantity UI control 806 that allows the customer 120 to specify the desired quantity of reserved instance(s) 104 to purchase through the reserved instance marketplace. In alternative embodiments, the customer computer system 122 may utilize a DescribeReservedInstanceListings API or other API 132 exposed by the reserved instance listings module 136 to specify one or more type and configuration parameter values, a term, and/or a quantity to be used for searching the reserved instance listings 134 for reserved instance(s) 104 to be purchased through the reserved instance marketplace.

Upon receiving the type and configuration parameter values, term, and/or quantity, the routine 700 proceeds from operation 702 to operation 704, where the reserved instance listings module 136 searches the reserved instance listings 134 in the database 130 or other storage system to locate listed reserved instances 104 that match the specified parameter values and term. According to one embodiment, the reserved instance listings module 136 locates the first matching reserved instance listing 134 having the lowest asking price 622 for the current selling term 620 based on the remaining term 614 of the associated reserved instance(s). If, at operation 706, insufficient quantity 616 of reserved instances 104 associated with the reserved instance listing 134 is available to cover the desired quantity specified, then the routine 700 returns to operation 704, where the reserved instance listings module 136 locates the reserved instance listing 134 with the next lowest asking price 622. The routine 700 continues until the desired quantity has been satisfied from the reserved instance(s) 104 associated with the lowest priced reserved instance listings 134.

According to one embodiment, the UI 800 may further include a pricing summary panel 808 that indicates the total sales price for the reserved instance(s) 104 associated with the matching reserved instance listings 134 located by the reserved instance listings module 136 sufficient to satisfy the desired quantity, based on the associated asking prices 622 for the current sellable term 620. The pricing summary panel 808 may further include an indication of the average usage price for the reserved instance(s) 104 to be purchased, which may be determined from the usage price of the reserved instances as originally sold to the selling customer 120. In another embodiment, the reserved instance listings module 136 may present a list of all matching reserved instance listings 134 to the buying customer 120, from lowest asking price 622 to highest asking price, for example, and allow the customer to select a quantity of the reserved instance(s) 104 associated with each reserved instance listing for purchase.

Figure 9:
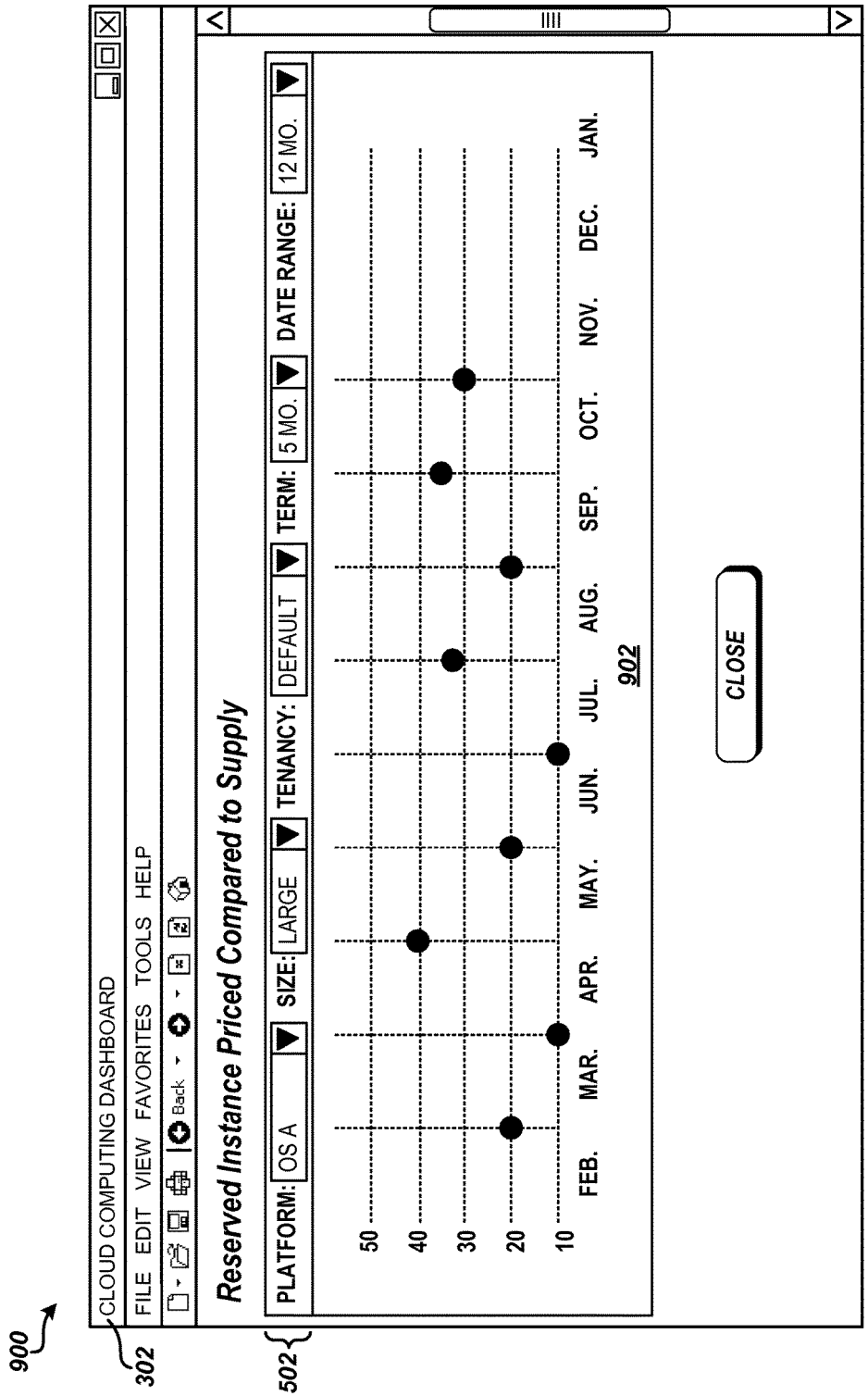

In further embodiments, the reserved instance listings module 136 may provide a supply-based pricing UI 900, such as that shown in FIG. 9. The supply-based pricing UI 900 may be shown to the customer 120 in the window 302 of the Web browser or other client application executing on the customer computer system 122, for example. The supply-based pricing UI 900 may include the same or similar selection UI controls 502 described above in regard to FIG. 5 that allow the buying customer 120 to select values for one or more type and configuration parameters (e.g. platform, size, tenancy, and the like) along with a remaining term and a date range for searching the reserved instance listings 134 in the database 130. The supply-based pricing UI 900 may further include a graph 902 indicating the number of reserved instances 104 available through the reserved instance marketplace at different average asking prices 622, based on the reserved instance listings 134 in the database matching the selected configuration parameter values and term.

Figure 10:
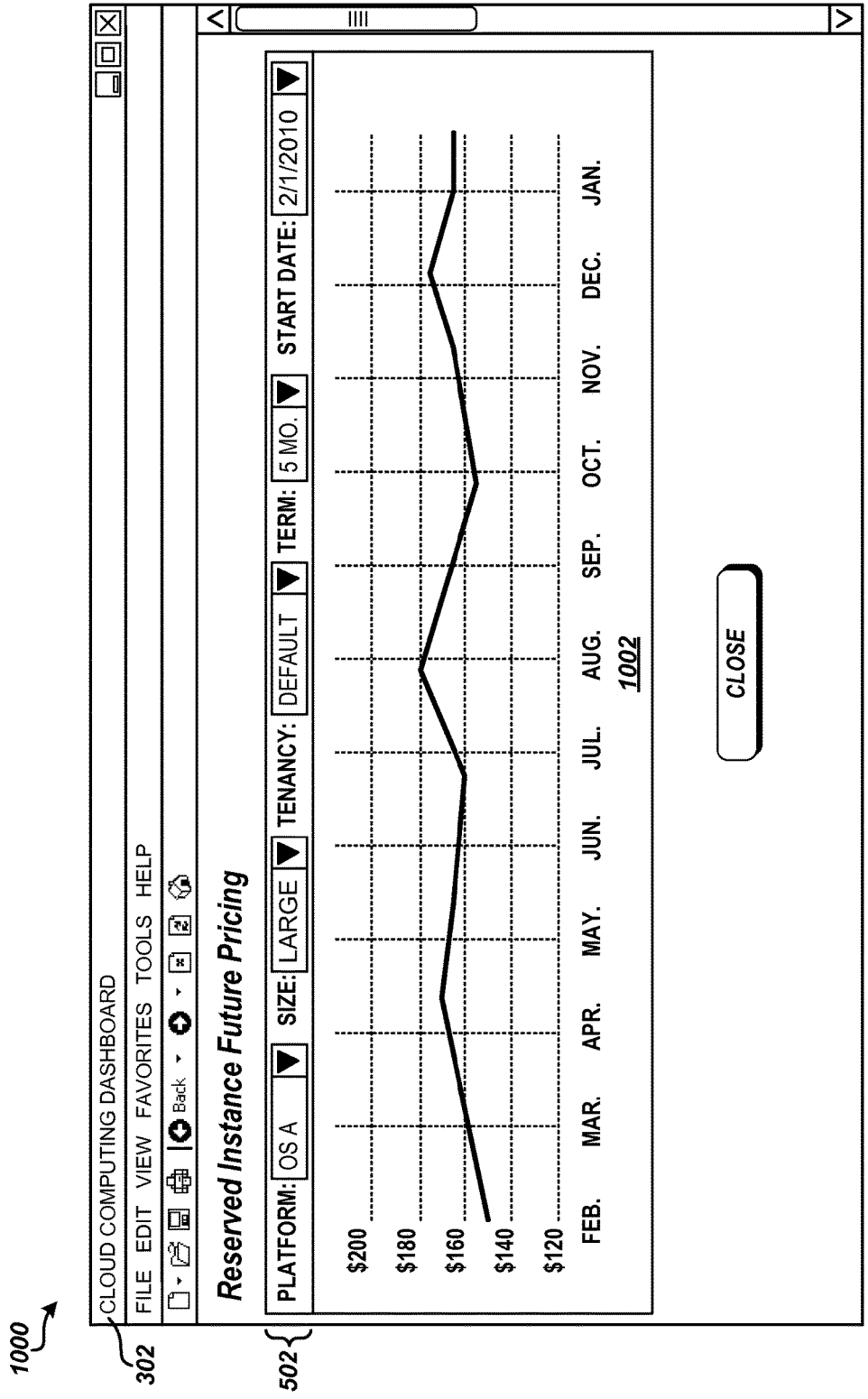

The reserved instance listings module 136 may further provide a future pricing UI 1000, such as that shown in FIG. 10, based on those reserved instance listings 134 having a start date 618 specified for listing the (portion of) the remaining term in the reserved instance(s) in the reserved instance marketplace, as described above in regard to FIG. 4. The future pricing UI 1000 may be shown to the customer 120 in the window 302 of the Web browser or other client application executing on the customer computer system 122, for example. The future pricing UI 1000 may include the same or similar selection UI controls 502 described above in regard to FIG. 5 that allow the buying customer 120 to select values for one or more type and configuration parameters (e.g. platform, size, tenancy, and the like) along with a term and a starting date for searching the reserved instance listings 134 in the database 130.

The future pricing UI 1000 may further include a pricing graph 1002 showing the lowest or average asking price(s) 622 of reserved instance listings matching the selected configuration parameters and having the selected term that will be available through the reserved instance marketplace at the specified starting date and beyond, as further shown in FIG. 10. The reserved instance listings module 136 may generate the pricing graph 1002 based on the start dates 618 specified in the matching reserved instance listings 134, for example. A buying customer 120 may utilize the pricing graph 1002 to determine the asking price associated with purchasing reserved instances at future times. Specifically, a customer 120 may select the key configuration parameters (e.g. platform, size, tenancy, and the like) associated with the desired reserved instances 104 and specify a starting date when they would like to start using the reserved instances. Since reserved instance listings 134 may not be available with a start date 618 indicating every time period in the pricing graph 1002, the reserved instance listings module 136 may use reserved instances listings that most closely match the selected parameters having the lowest asking price(s) 622 to generate the graph.

Once the desired quantity of reserved instances 104 has been located in the reserved instance listings 134 satisfying the customer's specification, the customer 120 may select a command UI control, such as the purchase reserved instances command UI control 810 shown in FIG. 8, to confirm the purchase of the specified reserved instance(s). In alternative embodiments, the customer computer system 122 may utilize a PurchaseReservedInstanceListing API or other API 132 exposed by the reserved instance listings module 136 to specify a quantity of reserved instances 104 associated with one or more reserved instance listings 134 for purchase by the buying customer 120.

The routine 700 then proceeds from operation 706 to operation 708, where the reserved instance listings module 136 transfers the selected reserved instance(s) 104 from the selling customer(s) 120, as indicated by the customer IDs 602 in the associated reserved instance listings 134, for example, to the buying customer. The transfer may be effected by updating the information regarding the reserved instances 104 stored in the customer/instance management data 128 in the database 130. In addition, the reserved instance listings module 136 may update the reserved instance listings 134 to indicate the associated reserved instance(s) 104 have been sold, and enter information regarding the sale in the reserved instance resale history data 138, as well. Upon completion of the sale, the associated reserved instance(s) 104 may be shown in the instance list 304 of the corresponding selling customers 120 with a current state of "Sold," according to one embodiment.

From operation 708, the routine 700 proceeds to operation 710, where the reserved instance listings module 136 effects transfer of funds to the selling customer(s) 120 for the total purchase price for the remaining term in the selected reserved instance(s) 104. The transfer of funds may be handled through credits to the customer(s) 120, or may include disbursements of funds to the customers through credit card or ACH transactions. In one embodiment, the cloud computing resource provider may retain a portion of the total purchase price as a transaction fee for the sale of the remaining term in the reserved instances 104 through the reserved instance marketplace. In a further embodiment, the transfer of funds to the selling customer(s) 120 may be handled as a refund by the cloud computing resource provider in exchange for the remaining term in the sold reserved instances 104. Additionally or alternatively, the reserved instance marketplace may be implemented to support a barter exchange of reserved instances. From operation 710, the routine 700 ends.

Figure 11:
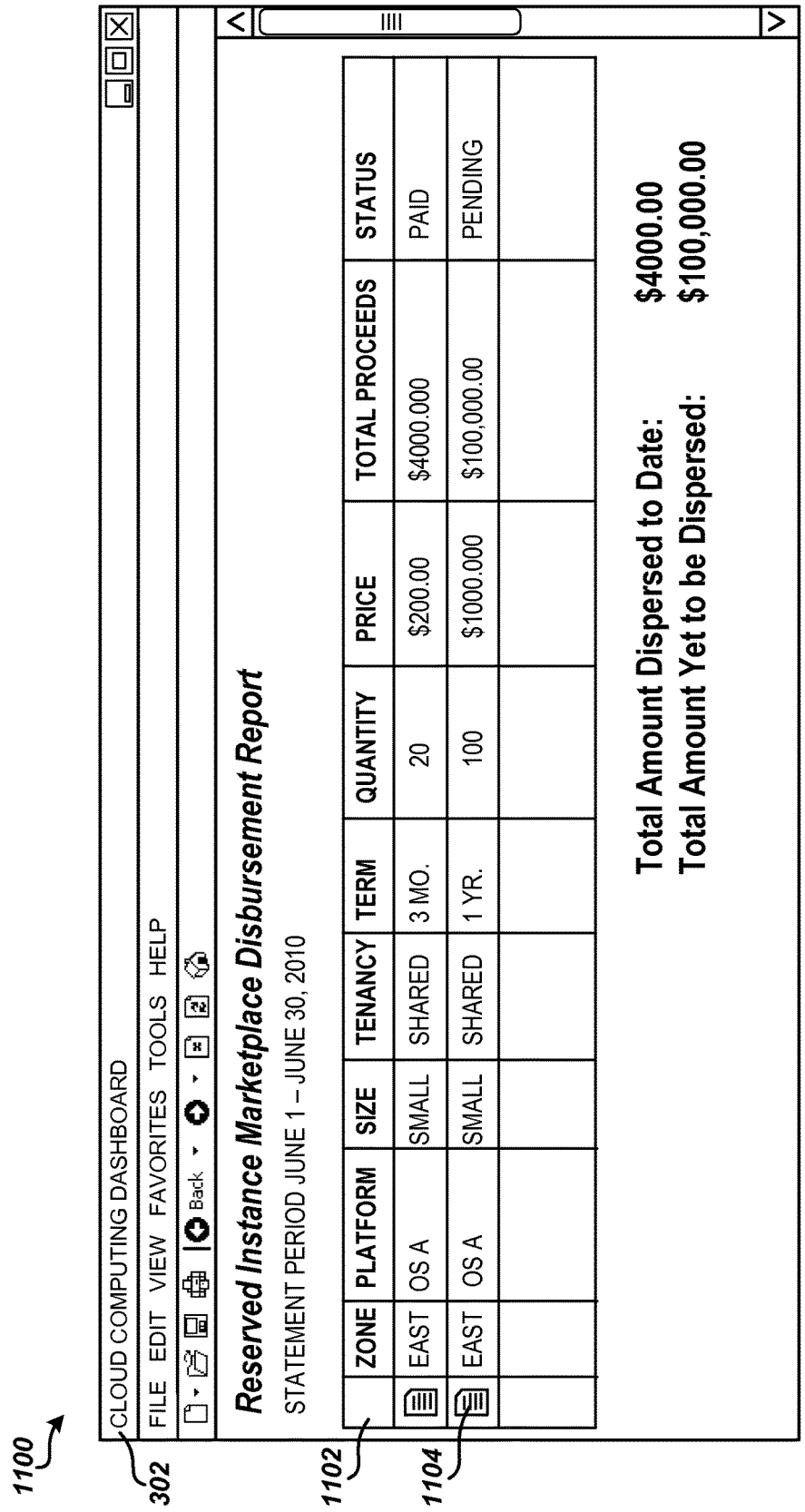
FIGS. 11 and 12 are screen diagrams showing illustrative user interfaces for providing disbursement reports to selling customers for reserved instances purchase through the reserved instance marketplace, according to embodiments presented herein.

In additional embodiments, the instance management module 126 may provide reporting functionality to the selling customer 120 allowing the customer to see the status of disbursement of funds for those reserved instance(s) 104 that have been transferred the selling customer 120 to a buying customer. For example, as shown in FIG. 11, the instance management module 126 or another module in the cloud computing platform 102 may present the UI 1100 to the customer 120 in the window 302 of the Web browser or other client application executing on the customer computer system 122. The UI 1100 may include a disbursement list 1102 listing those reserved instances 104 owned by the selling customer 120 that have been transferred to buying customers through the reserved instance marketplace, including the status of the disbursement of funds for the transferred reserved instances.

Figure 12:
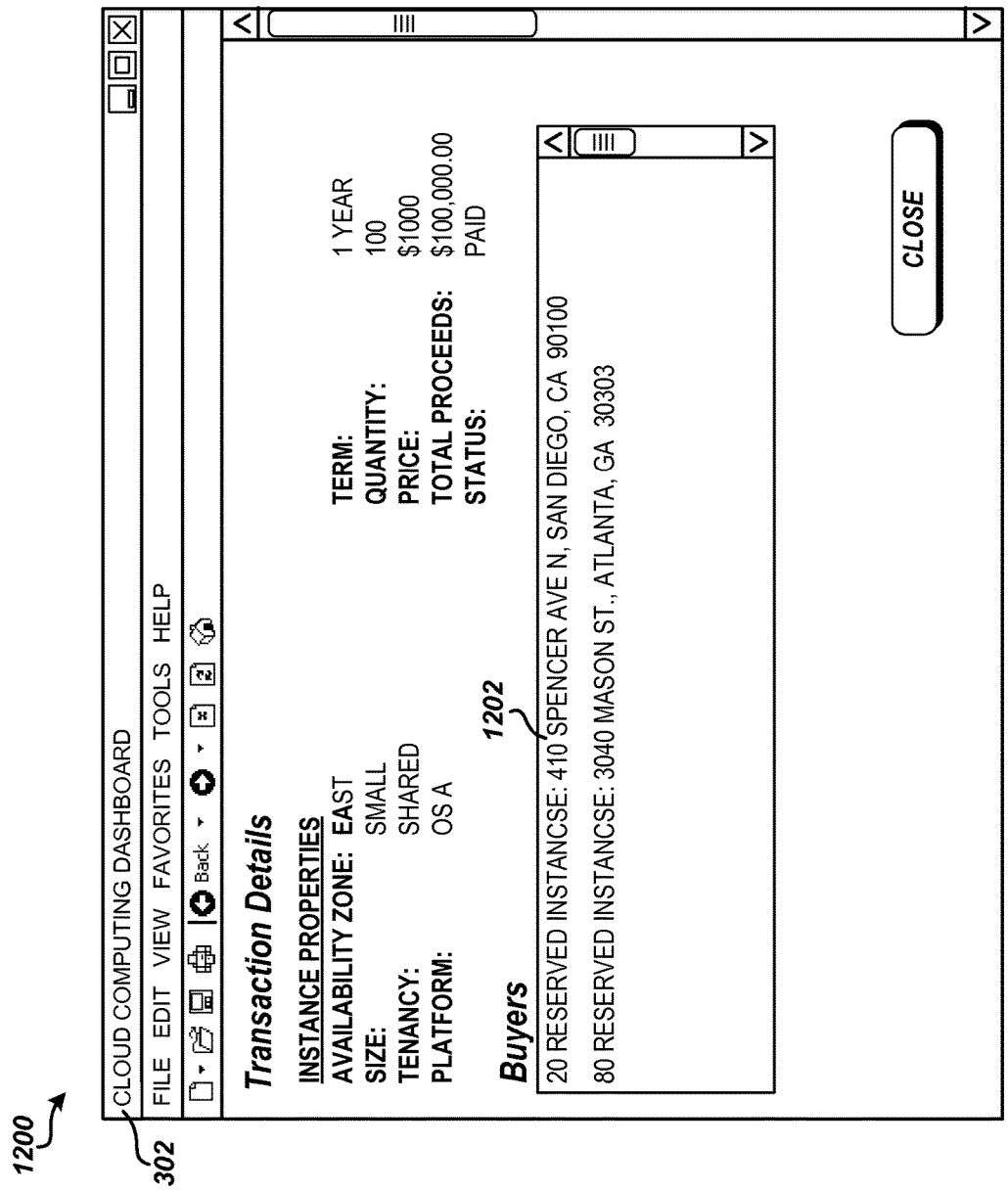

The disbursement list 1102 may further include a details UI control, such as the details UI control 1104 shown in FIG. 11, that allows the customer 120 to see additional details regarding the corresponding transaction. For example, selecting the details UI control 1104 may cause the instance management module 126 or another module in the cloud computing platform 102 to present the UI 1200 shown in FIG. 12 to the customer 120 in the window 302. The UI 1200 may contain the details of the transaction selected in the disbursement list 1102 along with additional details regarding the buying customers 120 to which the reserved instances 104 were transferred, as shown at 1202.

In further embodiments, the cloud computing resource provider may offer reserved instances 104 to customer 120 through the reserved instance marketplace, in order to test-out price elasticity of different prices for different terms, for example. Similarly, the cloud computing resource provider may purchase reserved instances 104 listed in reserved instance listings 134 in the database 130 in order to create more liquidity in the market or to retain capacity to meet overall demand for the cloud computing platform 102.

Figure 13:
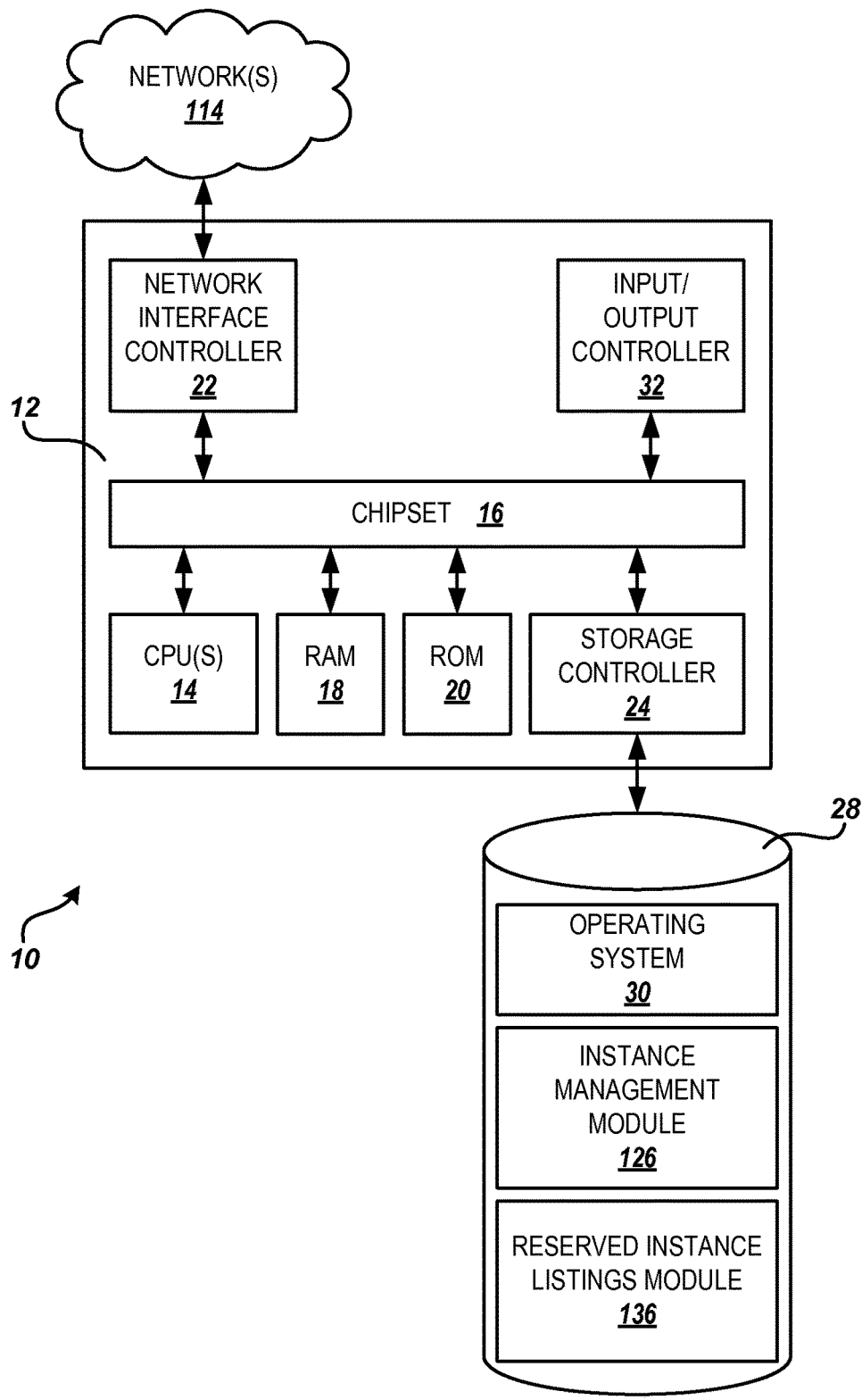
FIG. 13 is a computer architecture diagram showing an illustrative computer hardware architecture for computing devices described in embodiments presented herein.

FIG. 13 shows an example computer architecture 10 for a computer 12 capable of executing the software components described herein for providing a marketplace for the remaining term of reserved instances, in the manner presented above. The computer architecture 10 shown in FIG. 13 illustrates a conventional server computer, workstation, desktop computer, laptop, PDA, electronic book reader, digital wireless phone, network appliance, set-top box, or other computing device, and may be utilized to execute any aspects of the software components presented herein described as executing on the application servers 124, the end-user computer system 112, the customer computer system 122, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through a network, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. For example, the NIC 22 may be capable of connecting the computer 12 to other computing devices, such as other application servers 124, the end-user computer systems 112, the customer computer systems 122, a data storage system in the cloud computing platform 102, and like, over the network(s) 114 described above in regard to FIG. 1. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, or the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable medium to store and retrieve information, such as program modules, data structures, or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, and the like.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the instance management module 126 and/or the reserved instance listings module 136 described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routines 200 and 700 for providing a marketplace for the remaining term of reserved instances, as described above in regard to FIGS. 2 and 7.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computer 12 may not include all of the components shown in FIG. 13, may include other components that are not explicitly shown in FIG. 13, or may utilize an architecture completely different than that shown in FIG. 13.

Based on the foregoing, it should be appreciated that technologies for providing a marketplace for the remaining term of reserved instances are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for transferring remaining terms in reserved instances of remote computing resources, the method comprising executing instructions in a computer system to perform the operations of:

receiving, at one or more computing devices, a specification of reserved instances for an owning entity to transfer a portion of a remaining term in the reserved instances to one or more acquiring entities, wherein the reserved instances are data processing resources provided by a remote computing resource provider, wherein the portion of the remaining term is less than the remaining term, and wherein the specification of the reserved instances is included in a data file received from the owning entity, the data file including at least a number of processors, an amount of memory, and a number of networking addresses associated with the reserved instances;

receiving, at the one or more computing devices, a requested transfer cost associated with the portion of the remaining term in the reserved instances;

storing, by the one or more computing devices, the specification of the reserved instances and the requested transfer cost in a reserved instance listing associated with the reserved instances;

storing, by the one or more computing devices, a current state associated with the reserved instances indicating that the reserved instances are listed for transfer;

providing an interface for the one or more acquiring entities to search a plurality of reserved instance listings including the reserved instance listing associated with the reserved instances to locate the reserved instances;

receiving, from the one or more acquiring entities, a transfer request of the portion of the remaining term in the reserved instances;

transferring, by the one or more computing devices, the portion of the remaining term in the reserved instances to the one or more acquiring entities, the transferring including updating an entity identification in the specification of the reserved instances from the owning entity to the one or more acquiring entities;

storing, by the one or more computing devices, an updated state associated with the portion of the remaining term in the reserved instances indicating that the portion of the remaining term in the reserved instances is active for processing; and executing an application associated with the one or more acquiring customers on the portion of the remaining term in the reserved instances.

2. The computer-implemented method of claim 1, wherein the specification of the reserved instances comprises one or more of a size, a platform, a tenancy, or an availability zone for the reserved instances.

3. The computer-implemented method of claim 2, wherein the specification of the reserved instances further comprises a quantity of the reserved instances to transfer and a term specifying the portion of the remaining term to be transferred.

4. The computer-implemented method of claim 3, wherein the specification of the reserved instances is received from the owning entity through a user interface.

5. The computer-implemented method of claim 4, wherein the user interface comprises a last transfer cost of another reserved instance matching the specification of reserved instances.

6. The computer-implemented method of claim 4, wherein the user interface comprises a graph of transfer costs of historical reserved instances matching the specification of the reserved instances over a period of time as determined from reserved instance transfer history data.

7. The computer-implemented method of claim 3, wherein the specification of the reserved instances is received from the owning entity through an application programming interface exposed by a module executing in the computer system.

8. The computer-implemented method of claim 1, further comprising receiving a plurality of requested transfer costs, each of the plurality of requested transfer costs specified for a different term.

9. The computer-implemented method of claim 8, wherein each of the plurality of requested transfer costs is specified for a term between a minimum transferable period and the remaining term of the reserved instances rounded down to a nearest period.

10. The computer-implemented method of claim 1, further comprising:
receiving a second specification of reserved instances, the second specification including a target term;
searching one or more reserved instance listings to locate a first reserved instance listing associated with reserved instances matching the second specification and having a term for transfer equal to or greater than the target term with a lowest requested transfer cost;
determining that a sufficient quantity of reserved instances is associated with the first reserved instance listing to satisfy a target quantity; and
transferring the target quantity of reserved instances associated with the first reserved instance listing from the owning entity to the one or more acquiring entities.

11. The computer-implemented method of claim 10, wherein the second specification of reserved instances is received from the one or more acquiring entities through a user interface.

12. The computer-implemented method of claim 10, wherein the second specification of reserved instances is received from the one or more acquiring entities through an application programming interface exposed by a module executing in the computer system.

13. A computer-readable storage medium having computer-executable instructions stored thereon that, when executed by a computer, cause the computer to:
receive a specification of reserved instances for an owning entity to transfer a portion of a remaining term in the reserved instances to one or more acquiring entities, wherein the reserved instances are data processing resources provided by a remote computing resource provider, wherein the portion of the remaining term is less than the remaining term, and wherein the specification of the reserved instances is included in a data file received from the owning entity, the data file including at least a number of processors, an amount of memory, and a number of networking addresses associated with the reserved instances;
receive a requested transfer cost associated with the portion of the remaining term in the reserved instances;
store the specification of the reserved instances and the requested transfer cost in a reserved instance listing associated with the reserved instances;
store a current state associated with the reserved instances indicating the reserved instance are listed for transfer;
provide an interface for the one or more acquiring entities to search a plurality of reserved instance listings including the reserved instance listing associated with the reserved instances to locate the reserved instances;
receive, from the one or more acquiring entities, a transfer request of the portion of the remaining term in the reserved instances;
transfer the portion of the remaining term in the reserved instances to the one or more acquiring entities, the transfer including updating an entity identification in the specification of the reserved instances from the owning entity to the one or more acquiring entities;
store an updated state associated with the portion of the remaining term in the reserved instances indicating that the portion of the remaining term in the reserved instances is active for processing; and
execute an application associated with the one or more acquiring entities on the portion of the remaining term in the reserved instances.

14. The computer-readable storage medium of claim 13, having further computer-executable instructions stored thereon that, when executed by the computer, cause the computer to:
receive a second specification of reserved instances, the second specification comprising a target term;
search one or more reserved instance listings to locate a first reserved instance listing associated with reserved instances matching the second specification and having a term for transfer equal to or greater than the target term with a lowest requested transfer cost; and
transfer the reserved instances associated with the first reserved instance listing from the owning entity to the one or more acquiring entities.

15. The computer-readable storage medium of claim 14, having further computer-executable instructions stored thereon that, when executed by the computer, cause the computer to:
determine that a sufficient quantity of reserved instances is associated with the first reserved instance listing to satisfy a target quantity; and
transfer the target quantity of the reserved instances associated with the first reserved instance listing from the owning entity to the one or more acquiring entities.

16. The computer-readable storage medium of claim 13, having further computer-executable instructions stored thereon that, when executed by the computer, cause the computer to receive a plurality of requested transfer costs, each of the plurality of requested transfer costs specified for a term between a minimum transferable term and a maximum transferable term based on the remaining term of the reserved instances.

17. The computer-readable storage medium of claim 13, wherein the portion of the remaining term is selected from a minimum transferable term to a term determined by rounding the remaining term of the reserved instances down to a nearest period.

18. A system for transferring remaining terms in reserved instances of remote computing resources, the system comprising one or more computing devices configured to:
receive, from a computing device, a data file including a specification of reserved instances for an owning entity to transfer a portion of a remaining term in the reserved instances to one or more acquiring entities, wherein the reserved instances are data processing resources provided by a remote computing resource provider, wherein the portion of the remaining term is less than the remaining term, and wherein the data file includes at least a number of processors, an amount of memory, and a number of networking addresses associated with the reserved instances;
receive a requested transfer cost associated with the portion of the remaining term in the reserved instances;

store the specification of the reserved instances and the requested transfer cost in a reserved instance listing associated with the reserved instances;

store a current state associated with the reserved instances indicating the reserved instances are listed for transfer;

provide an interface for the one or more acquiring entities to search a plurality of reserved instance listings including the reserved instance listing associated with the reserved instances to locate the reserved instances;

receive, from the one or more acquiring entities, a transfer request of the portion of the remaining term in the reserved instances;

transfer the portion of the remaining term in the reserved instances to the one or more acquiring entities, the transfer including updating an entity identification in the specification of the reserved instances from the owning entity to the one or more acquiring entities;

store an updated state associated with the portion of the remaining term in the reserved instances indicating that the portion of the remaining term in the reserved instances is active for processing; and execute an application associated with the one or more acquiring customers on the portion of the remaining term in the reserved instances.

19. The system of claim 18, wherein the one or more computing devices are further configured to:

receive a second specification of reserved instances, the second specification comprising a target term;

search one or more reserved instance listings to locate a first reserved instance listing associated with reserved instances matching the second specification and having a term for transfer equal to or greater than the target term with a lowest requested transfer cost; and transfer the reserved instances associated with the first reserved instance listing from the owning entity to the one or more acquiring entities.

20. The system of claim 19, wherein the one or more computing devices are further configured to:

determine that a sufficient quantity of reserved instances is associated with the first reserved instance listing to satisfy a target quantity; and transfer the target quantity of reserved instances associated with the first reserved instance listing from the owning entity to the one or more acquiring entities.

21. The system of claim 18, wherein the one or more computing devices are further configured to receive a plurality of requested transfer costs, each of the plurality of requested transfer costs specified for a term between a minimum transferrable term and a maximum transferrable term based on the remaining term of the reserved instances.

22. The system of claim 18, wherein the portion of the remaining term is selected from a minimum transferrable term to a term determined by rounding the remaining term of the reserved instances down to a nearest period.

* * * * *